(12) United States Patent
Parker

(10) Patent No.: US 7,075,761 B2
(45) Date of Patent: Jul. 11, 2006

(54) LEAD-DEFINED AND SHAPED MAGNETIC SENSOR

(75) Inventor: Michael Andrew Parker, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 571 days.

(21) Appl. No.: 10/237,654

(22) Filed: Aug. 27, 2002

(65) Prior Publication Data

US 2004/0042133 A1    Mar. 4, 2004

(51) Int. Cl.
*G11B 5/39*    (2006.01)

(52) U.S. Cl. .............................. 360/327.3; 360/324.12

(58) Field of Classification Search .............. 360/327.3
See application file for complete search history.

(56) References Cited

U.S. PATENT DOCUMENTS

| | | | |
|---|---|---|---|
| 4,556,925 A * | 12/1985 | Suenaga et al. | 360/327 |
| 4,956,736 A | 9/1990 | Smith | |
| 5,438,470 A | 8/1995 | Ravipat et al. | |
| 5,491,600 A | 2/1996 | Chen et al. | |
| 5,608,593 A | 3/1997 | Kim et al. | |
| 5,654,854 A | 8/1997 | Mallary | |
| 5,699,213 A | 12/1997 | Ohyama | |
| 5,748,415 A * | 5/1998 | Christner et al. | 360/327 |
| 5,847,904 A | 12/1998 | Bharthulwar | |
| 5,883,764 A | 3/1999 | Pinarbasi | |
| 5,910,344 A | 6/1999 | Hasegawa et al. | |
| 5,930,084 A | 7/1999 | Dovek et al. | |
| 5,959,809 A | 9/1999 | Uehara | |
| 6,023,395 A | 2/2000 | Dill et al. | |
| 6,665,156 B1 * | 12/2003 | Miyazawa et al. | 360/327.31 |
| 6,735,062 B1 * | 5/2004 | Pokhil et al. | 360/324.12 |

* cited by examiner

*Primary Examiner*—Angel Castro C
*Assistant Examiner*—Christopher R. Magee
(74) *Attorney, Agent, or Firm*—G. Marlin Knight

(57) ABSTRACT

A magnetic recording transducer, useful in a magnetic data storage device, having a read element with improved magnetic stability and a narrow track width is described. An MR stripe according to the invention has a magnetic-stability inducing (MSI) shape selected from an essentially trapezoidal shape, an essentially hexagonal shape, an essentially race-track shape, and an essentially half race track shape. These MSI shapes are oriented in a plane perpendicular to the air-bearing surface (ABS). The MSI shapes are used to encourage the formation of a single magnetic domain state with magnetization direction parallel to the ABS in the absence of a magnetic bias. In one embodiment according to the invention the sensor structure is overlaid on the sides of the top surface with layers of electrically conductive material (overlaid leads) to define an approximately rectangular active region of the larger MSI shape. A sensor structure according to the invention with overlaid leads will have a narrower track width with improved magnetic stability than a sensor which has a comparable volume of magnetoresistive material in a rectangular MR stripe. In another embodiment of the invention the sensor structure has edge-butt leads that make contact at the outer edges of the sensor without substantially overlaying the top surface.

18 Claims, 5 Drawing Sheets

(A)

(B)

(C)

LEAD-DEFINED AND SHAPED MAGNETIC SENSOR

FIELD OF THE INVENTION

The invention relates to the field of magnetic transducers (heads) having MR or GMR sensor elements and more particularly to the structure of the MR/GMR sensor and the leads connected to the sensor.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write element 23) and reading the magnetic transitions (the read element 12). The electrical signals to and from the read and write head elements 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write element 23 records the magnetic transitions in which information is encoded. A tape based storage system (not shown) uses a magnetic transducer in essentially the same way as a disk drive, with the moving tape being used in place of the rotating disk 16.

There are several types of read elements 12 including giant magnetoresistive (GMR) and tunnel junction. A spin valve (SV) head is a particular type of GMR head. A typical SV head (not shown) has a pinned ferromagnetic layer and a free ferromagnetic layer separated by a nonmagnetic metal spacer layer. The free ferromagnetic layer functions as the sensor element and is typically a rectangular strip of material with a conductive lead in electrical contact with each side as viewed in a plan view. Various methods of establishing the electrical contact have been described including, for example, butting the leads up against the sensor element at the ends, separating the leads from the sensor by a thin capping layer and overlaying the lead layers on the top surface of the sensor stack which may have a capping layer.

Typically leads (not shown) are made from single layers of copper, rhodium, molybdenum, tungsten, tantalum or gold, but leads with a multilayer structure have been proposed. For example, U.S. Pat. No. 5,438,470 to Ravipati, et al., suggest using a thin layer of tantalum under a layer of gold for the leads. U.S. Pat. No. 5,491,600 to Chen, et al., describes leads with two refractory metal layers sandwiching a highly conductive metal layer. One multilayer embodiment has alternating layers of tantalum and gold. U.S. Pat. No. 5,883,764 to Pinarbasi similarly describes a multilayer lead structure of Ta/Cr/Ta for use with a hard bias layer of CoPtCr.

The need for increased track density in disk drives means that the magnetic sensors must be improved to read from narrower tracks while maintaining the required magnetic stability. There have been some efforts to stabilize very narrow sensor elements by using increasingly thick hard bias structures, but there has been only limited success with this "brute force" approach. One problem with this approach is that it consumes the total gap tolerance for the combined sensor/lead structure leaving little margin for insulating gap layers to provide edge coverage and for electrical insulation from the shields. Consequently these designs require complex mask steps and decrease yield through losses due to shield shorts.

U.S. Pat. No. 5,608,593 to Kim, et al., describes a method of increasing stability of an SV head by forming the free layer in a "mesa structure," i.e., a shape with a trapezoidal cross section as taken parallel to the ABS. The leads are disposed off to the sides of the free layer and are separated from the free layer by permanent magnet layers.

U.S. Pat. No. 5,654,854 to Mallary describes the use of a sensor with a concave back which is said to provide an effective longitudinal bias field in the center of the active MR element to prevent multi-domain states.

SUMMARY OF THE INVENTION

A magnetic recording transducer, useful in a magnetic data storage device, having a read element with improved magnetic stability and a narrow track width is described. A read element of a magnetic transducer according to the invention includes magnetoresistive material (MR stripe) which has a magnetic-stability inducing (MSI) shape. The MSI shapes according to the invention include an essentially trapezoidal shape, an essentially hexagonal shape, an essentially "race-track" shape, and an essentially half-race track shape. These MSI shapes are oriented in a plane perpendicular to the airbearing surface (ABS). The MSI shapes are used to encourage the formation of a single magnetic domain state with magnetization direction parallel to the ABS in the absence of a magnetic bias. The angles need not be precisely 120 degrees and may be made asymmetrical. In one embodiment according to the invention the sensor structure is overlaid on the sides of the top surface with layers of electrically conductive material (overlaid leads) to define an approximately rectangular active region within the larger MSI shape. A sensor structure according to the invention with overlaid leads will have a narrower track width with improved magnetic stability than a sensor which has a comparable volume of magnetoresistive material in a rectangular MR stripe. In another embodiment of the invention the sensor structure has edge-butt leads that make contact at the outer edges of the sensor without substantially overlaying the top surface.

DETAILED DESCRIPTION OF THE INVENTION AND THE PREFERRED EMBODIMENTS

Figure 1:
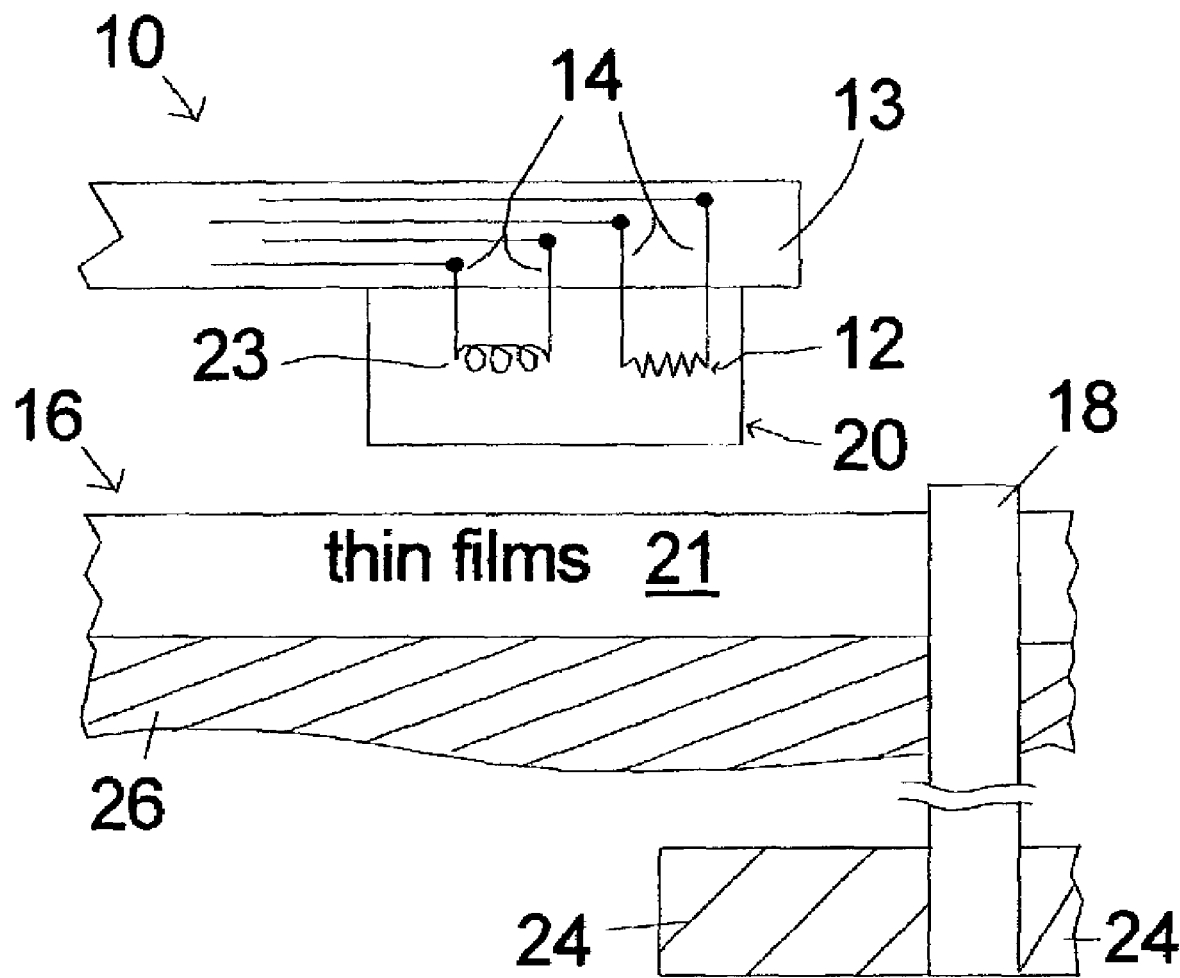
FIG. 1 is a symbolic illustration of a prior art disk drive in which the head of the invention can be embodied, showing the relationships between the head and associated components.

The relative sizes/thickness of the components are according to prior art principles except where noted below. The hatching lines in the drawings are not intended to represent the material composition of a structure, but are used only to distinguish structures and aid in the explanation of the process of making the write element.

GMR/MR sensor elements with rectangular shapes have an inherent tendency to break up into multiple magnetic domain states due to effects of energy minimization associated with closure domain formation. In general, these closure domains are associated with the junction of three domain walls where the angle between the walls is 120 degrees. This angle is known to be associated with minimal wall energy and may be thought of as a critical angle for energy minimization. An MR stripe with a trapezoidal shape can be formed with an angle of 120 degrees. There are other shapes which have similar properties such as a hexagon, a "race-track", and a half-race track. Collectively these shapes will be called "magnetic-stability-inducing (MSI) shapes."

GMR/MR sensor elements with MSI shapes in a plane perpendicular to the ABS are believed to provide improved stability over rectangular shapes by tending to establish a single domain state parallel to the ABS with minimum energy within the sensor. These shapes solve the problem of transfer curve instabilities associated with multiple domain states by intrinsically creating an energy barrier favoring a single domain state. In addition, the MSI shaped sensor eliminates nucleation sites for spurious closure domains at the corners of the MR stripe.

However, due to the varying MR width (MRW) the sensitivity profile of an essentially trapezoidal shaped sensor is expected to have undesirable "tails." One embodiment of the invention solves the increased tail problem by establishing an active rectangular region by using the lead layers to define a rectangular shape from a larger trapezoidal shaped MR stripe. The active rectangular region thus formed provides an effectively constant MRW for signals coming from the media. The track width is significantly influenced by the lead-defined region while the magnetic material outside of the lead-defined region still contributes to magnetic stability.

Figure 2:
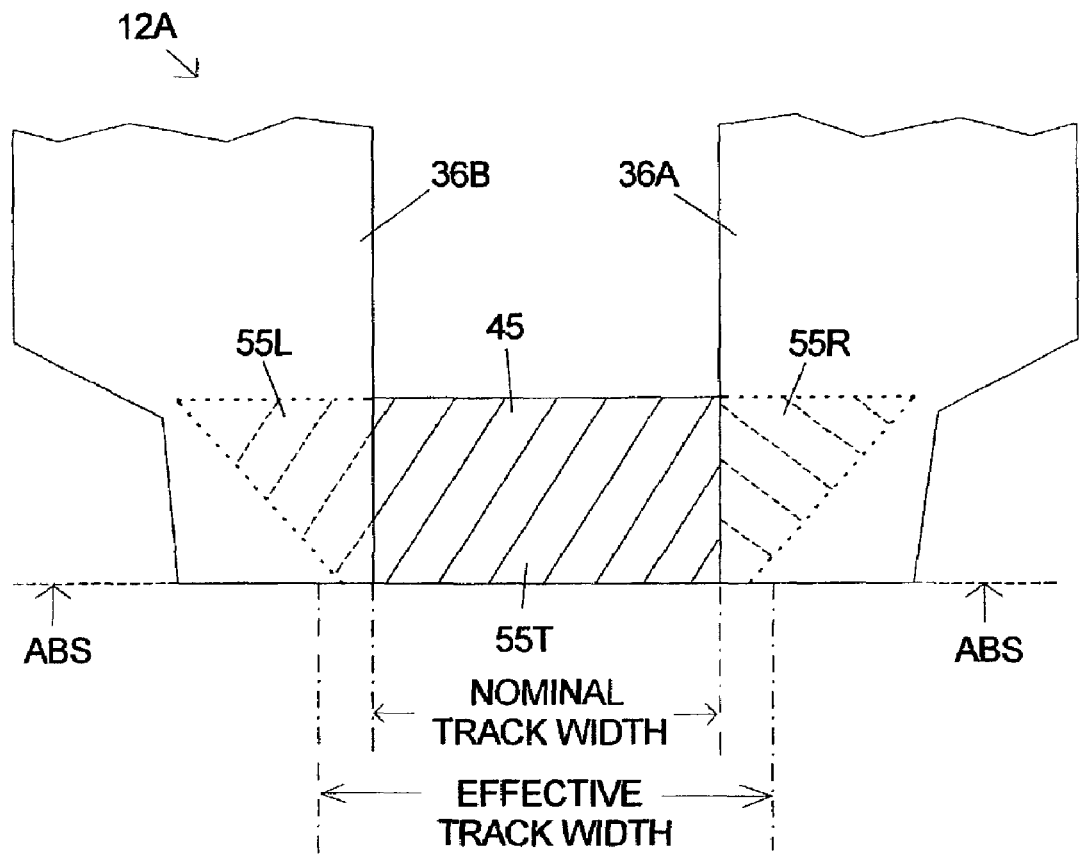
FIG. 2 is an illustration of the MR stripe and lead layers in read element according to a first embodiment of the invention as viewed in a plan view.

A preferred embodiment according to the invention of a read element 12A is illustrated in FIG. 2 which is a plan view of the trapezoid shaped magnetoresistive sensor structure 45 and the lead layers 36A, 36B. The lead layers 36A, 36B contact outer portions of the magnetoresistive sensor structure 45 which are shown in phantom as contact areas 55L, 55R. The magnetoresistive sensor structure 45 may have multiple layers in addition to an MR stripe as is known in the prior art. The internal surface area of the magnetoresistive sensor structure 45 that is not covered by either of the lead layers is rectangular area 55T. The contact areas 55L, 55R are approximately triangular, but due to overlays of the lead layers with the sensor layers the portion of the triangle corners adjacent to the ABS are truncated so that a quadrilateral of approximately triangular shape is obtained. The base (the longest of the two parallel sides) of the trapezoidal shape is farthest away from the ABS, i.e., at the back of the stripe.

The effective track width is shown in FIG. 2 as extending wider than the nominal track width defined by the separation of the lead layers which is less than the narrowest dimension of the trapezoidal magnetoresistive sensor structure 45, but not as wide as the base of the trapezoid. The fact that the track width is narrower than the widest dimension of the MR stripe is an advantage of the invention. The rectangular area 55T defined by the nominal track width substantially defines the active region of the magnetoresistive sensor structure 45. Due to the sensitivity of some sensor layers under the lead layers, the actual active region may be somewhat larger defining an effective track width. The contact areas 55L, 55R contribute to the magnetic stability as noted above.

Figure 3:
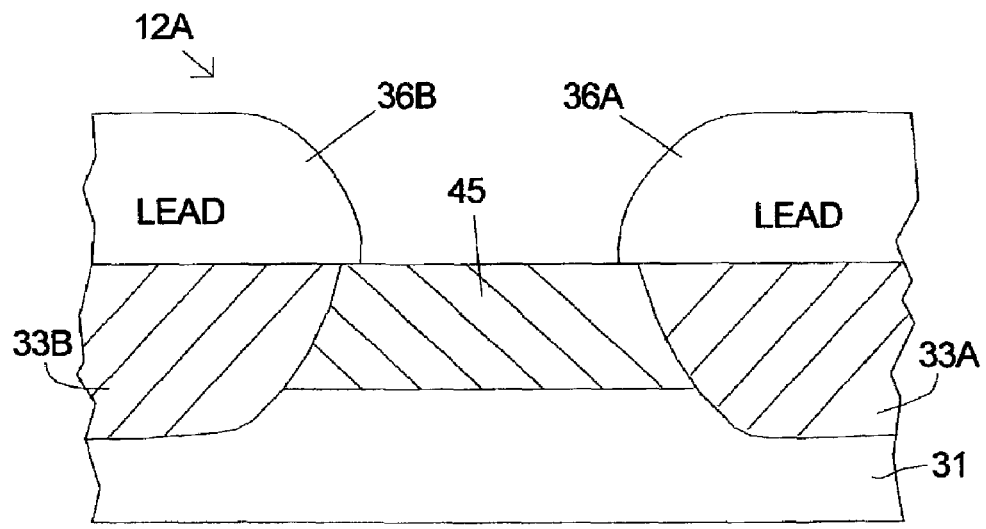
FIG. 3 is an illustration of the MR stripe and lead layers in read element according to the first embodiment of the invention as viewed from the ABS.

FIG. 3 illustrates the relevant structures of the read element 12A as viewed from the ABS. In this view the magnetoresistive sensor structure 45 is disposed between the hard bias elements 33A, 33B. The magnetoresistive sensor structure 45 and the hard bias elements 33A, 33B are disposed on gap layer 31. An alternative embodiment could include a prior art capping layer (not shown) which separates the lead layers from physical contact with the MR stripe.

Figure 4:
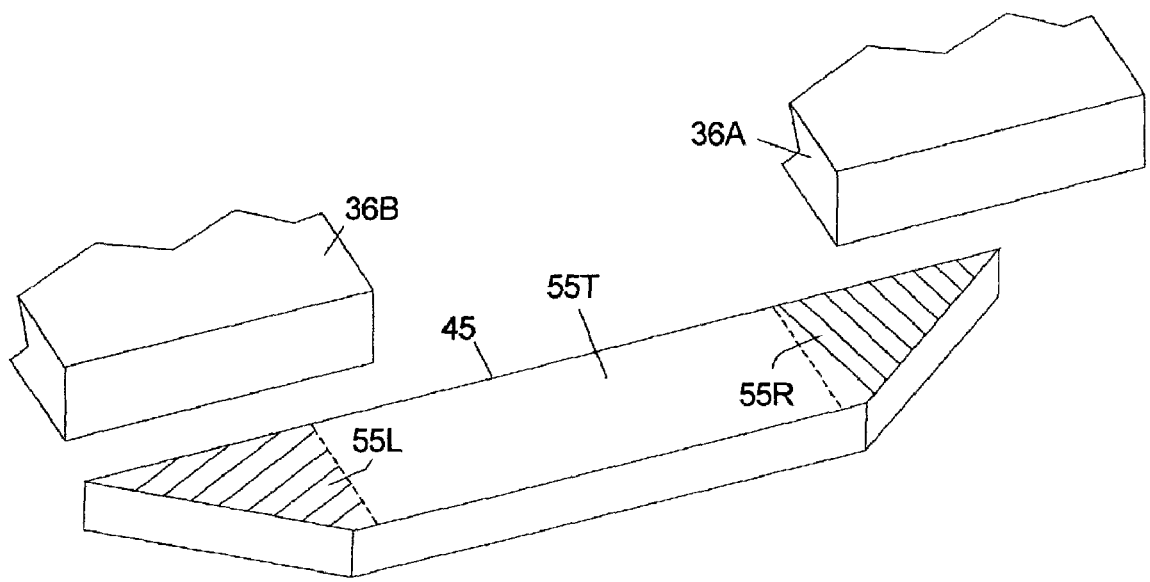
FIG. 4 is an exploded isometric view which illustrates the respective shapes of the MR stripe and lead layers according to the first embodiment of invention.

FIG. 4 illustrates an additional isometric view of the lead layers 36A, 36B and the magnetoresistive sensor structure 45, as well as, the contact areas 55L, 55R and the central rectangular area 55T.

Figure 5:
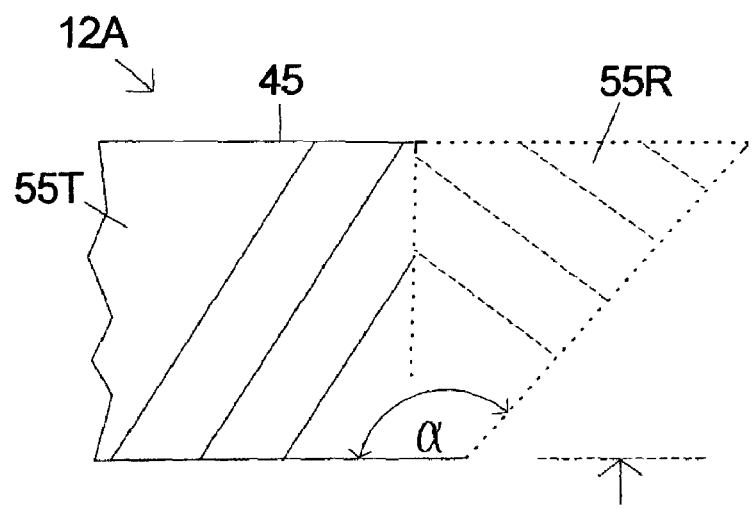
FIG. 5 is an enlarged plan view of one side of the MR stripe according to the invention.

FIG. 5 will be used to clarify the discussion of the angles of the trapezoidal shape. The angle $\alpha$ between the ABS and the outer edge of the magnetoresistive sensor structure 45 is preferably 120 degrees. Making this angle 120 degrees will help maintain a single domain state in a stripe with an essentially trapezoid shape; this 120 degree angle may be viewed as a critical angle for energy minimization and, therefore, tends to result in higher sensor stability. The lead layers which contact the MR stripe or the capping layer can be fabricated according to prior art principles. Thus, the lead layers and the associated conductive material required to make the electrical connection to the surface of the slider can be made in multiple segments. Magnetic transducers having the lead defined sensors according to the invention can be fabricated using prior art materials and techniques. The leads may be single layer or they may be any of the multilayered varieties known in the prior art.

It is conventional for thousands of heads to be manufactured simultaneously on a single wafer. For simplicity the following will describe the actions or structures for a single head, but it is to be understood that the process steps are performed over the entire wafer and are, therefore, forming structures for thousands of heads simultaneously as in conventional "batch" processing methods. The sensor structure with an MR stripe is formed using prior art techniques except that the masks used to define the shape of the MR stripe create a shape which will be trapezoidal after the heads are cut from the wafer and lapped. Note that the final trapezoidal shape may be formed by the cutting and lapping steps. For example, the MR stripe could be deposited in a triangular shape and then cut across the apex of the triangle to leave a trapezoidal shape. As noted above optionally a capping layer may be formed on the sensor structure prior to the formation of the lead layers. Photoresist material may be used to protect the areas where no conductive lead material is needed such as the central area of the surface of the MR stripe. The conductive material for the lead layers can then be sputter deposited over the entire surface of the wafer. The photoresist is then dissolved to remove the unwanted lead material that was deposited on the mask. If multilayered leads are used then the various layers will be sequentially deposited prior to removing the photoresist. Once all of the subsequent layers and structures have been formed on the wafer, the rows of heads are cut from the wafer. The cut exposes what will become the ABS which must be along the shorter line of the trapezoid which is parallel to the base. The rows of heads are typically lapped to achieve a well controlled stripe height defined by the altitude of the trapezoid. Ultimately the individual heads are cut from the rows and the processing of heads according to the invention proceeds as in the prior art. The foregoing method is given as an example, but other methods of producing head structures can be utilized to form the trapezoidal shape and form the lead layers in the proper position.

Figure 6:
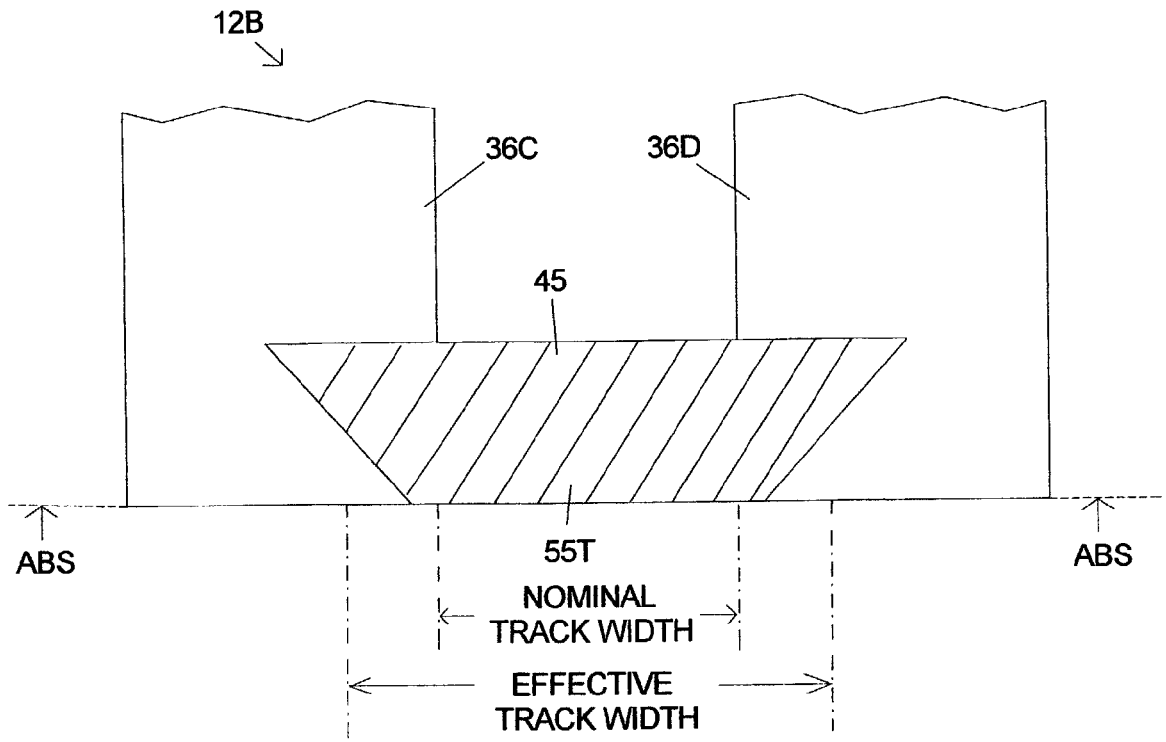
FIG. 6 is an illustration of the MR stripe and lead layers in read element according to a second embodiment of the invention as viewed in a plan view.
Figure 7:
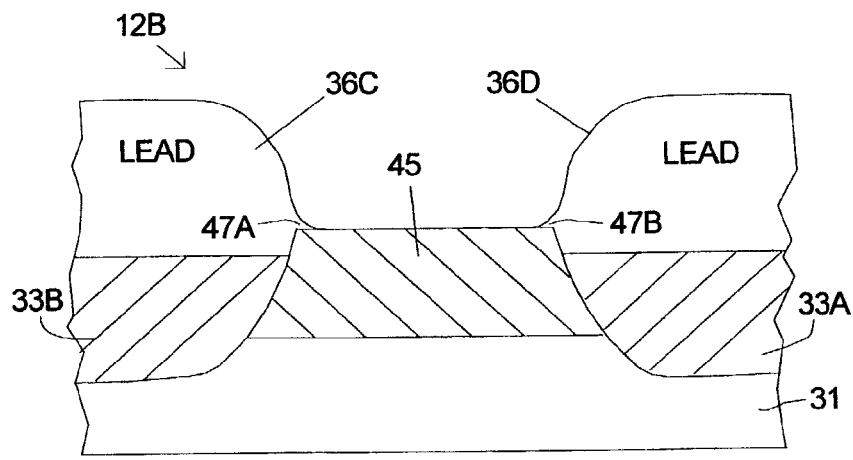
FIG. 7 is an illustration of the MR stripe and lead layers in read element according to the second embodiment of the invention as viewed from the ABS.

FIGS. 6 and 7 illustrate a second embodiment of the invention in read element 12B. FIG. 6 shows a plan view of the lead layers 36C, 36D and the trapezoidal shaped sensor 45. In this embodiment the lead layers 36C, 36D do not substantially overlay the top surface of the sensor 45, but rather contact the sensor 45 essentially at the edges as shown in FIG. 7. As will be noted below, the leads will have a small contact area on the top surface due to an undercut of the photoresist mask. The advantage of this embodiment is that the mask used to define the sensor 45 can also be used for the lead layers 36C, 36D. A disadvantage of this embodiment is that the effective track width is wider than for the overlaid lead embodiment as will be seen by comparing FIGS. 2 and 6. After the layer(s) of material for the sensor 45 has been deposited, a photoresist mask (not shown) is used to protect the sensor 45 while the unwanted material is etched away. The etching exposes the edges of the sensor 45. Due to the undercut in the photoresist mask (not shown) the leads extend as tapered protrusions structures 47A, 47B known in the art as "birds' beaks", slightly within the outer edges of the photoresist mask for the sensor 45, after the lead layer material is deposited in contact with the exposed outer edges of the sensor. FIG. 7 is schematic for emphasizing the contiguous and self-aligned nature of the junction between the sensor and the leads, but depending on the process, similar "birds' beaks" may be produced in the hard bias layer at the edges of the sensors. After the mask is stripped, the sensor 45 and lead layers 36C, 36D as viewed parallel to the ABS are shown in FIG. 7.

Figure 8:
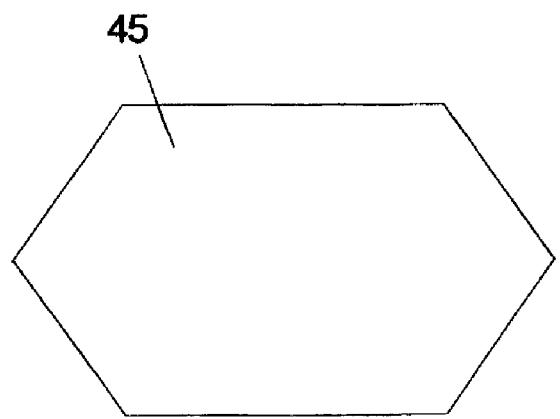
FIG. 8 is an illustration of alternative shapes for an MR stripe according to the invention as viewed in a plan view.
Figure 8:
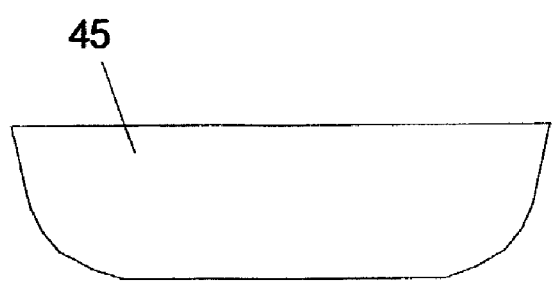
Figure 8:
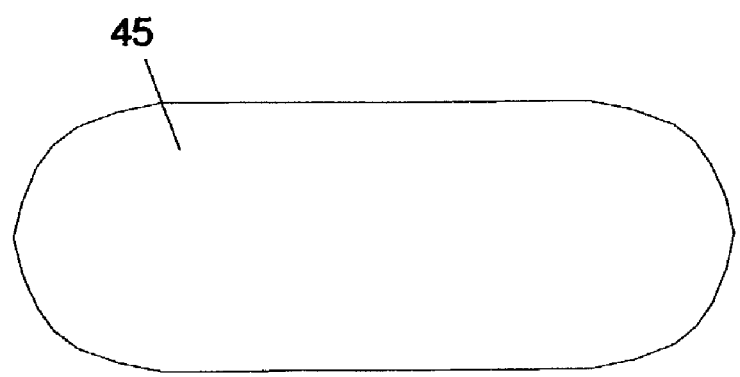

In addition to the trapezoidal shape, there are other MSI shapes that are expected to have similar stability. The trapezoidal shape has certain advantages in that it is the easiest to manufacture and results in a shorter stripe height, but the shapes shown in FIG. 8 are also useful. Each of the MSI shapes shown in FIG. 8 are sectional views taken perpendicular to the ABS. The hexagonal shaped sensor shown in FIG. 8(a) preferably has 120-degree angles at the ABS as was noted for the trapezoidal shape sensor. The hexagonal shaped sensor can conceptually be thought of as two mirror image trapezoidal shapes with their common bases joined along the center-line of the hexagon. The hexagonal shaped sensor is, therefore, symmetrical around this center-line. The "half-race-track" shape shown in FIG. 8(b) is derived from the trapezoidal shape by slightly curving the sides and rounding the corners at the ABS. The longest side of the half-race-track shape (which will be called the base) is farthest away from the ABS, i.e., at the back of the stripe. The "race-track" shape shown in FIG. 8(c) is derived from the hexagonal shape by slightly curving the sides and rounding the corners at the ABS and the back of the sensor. The "racetrack" shape is essentially an oval shape with straight-line segments parallel to its major axis. The "race-track" shaped sensor is, therefore, symmetrical around a center-line parallel to the ABS. The ABS surface of the sensor is always flat regardless of which shape is used. The lead connections for each of these shapes can be edge-butt or overlaid on the shaped surface as described above. When the overlaid leads are used it is preferred that the central area between the leads be rectangular as was described for the trapezoidal shape. Overlaid leads on the top of these MR stripes with the alternative MSI shapes will have the effect of narrowing the effective track width as was described for the trapezoidal shape.

The invention relates to the read element portion of the magnetic transducer and does not place limits on the type of write element that can be used with it.

Other variations and embodiments according to the invention will be apparent to those skilled in the art that will nevertheless be with the spirit and scope of the invention.

What is claimed is:

1. A magnetic transducer comprising: a sensor structure including a stripe of magnetoresistive material (MR stripe) having trapezoidal shape in a plane perpendicular to the air-bearing surface (ABS) with a planar surface at the ABS and the trapezoidal shape having a base at a back of the stripe; and first and second leads in electrical contact with first and second selected contact areas of the stripe of magnetoresistive material.

2. The magnetic transducer of claim 1 wherein the first and second leads are substantially overlaid, with the first and second selected contact areas including areas on top of the stripe of magnetoresistive material and the first and second selected contact areas being separated by a central rectangular area of the MR stripe.

3. The magnetic transducer of claim 1 wherein the first and second leads are of the edge-butt type with the first and second selected contact areas consisting essentially of first and second edges of the stripe of magnetoresistive material, the first and second selected contact areas being separated by the MR stripe.

4. The magnetic transducer of claim 1 wherein the trapezoidal shape has substantially symmetric 120-degree angles at the air-bearing surface.

5. The magnetic transducer of claim 1 wherein the MR stripe favors a single domain state by having a minimum energy level resulting from the trapezoidal shape with a magnetization direction of the single domain state essentially parallel to the air-bearing surface in the absence of a magnetic bias.

6. The magnetic transducer of claim 2 wherein the trapezoidal shape has substantially symmetric 120-degree angles at the ABS.

7. The magnetic transducer of claim 2 wherein the MR stripe favors a single domain state by having a minimum energy level resulting from the trapezoidal shape with a magnetization direction of the single domain state essentially parallel to the air-bearing surface in the absence of a magnetic bias.

8. The magnetic transducer of claim 3 wherein the trapezoidal shape has substantially symmetric 120-degree angles at the air-bearing surface.

9. The magnetic transducer of claim 3 wherein the MR stripe favors a single domain state by having a minimum energy level resulting from the trapezoidal shape with a magnetization direction of the single domain state essentially parallel to the air-bearing surface in the absence of a magnetic bias.

10. A disk drive comprising: a disk having a thin film of ferromagnetic material on a planar surface of the disk; a spindle rotatably supporting the disk; an actuator supporting a magnetic transducer having an air-bearing surface (ABS) confronting the planar surface of the disk; and the magnetic transducer including a read element comprising: a sensor structure including a stripe of magnetoresistive material (MR stripe) having a trapezoidal shape in a plane perpendicular to the air-bearing surface (ABS) with a planar surface at the ABS and the trapezoidal shape having a base at a back of the stripe; and first and second leads in electrical contact with first and second selected contact areas of the stripe of magnetoresistive material.

11. The disk drive of claim 10 wherein the first and second leads are overlaid on top of the MR stripe.

12. The disk drive of claim 10 wherein the first and second leads are edge-butt leads contacting the MR stripe at first and second edges of the MR stripe.

13. The disk drive of claim 10 wherein the trapezoidal shape has substantially symmetric 120-degree angles at the air-bearing surface.

14. The disk drive of claim 10 wherein the MR stripe favors a single domain state by having a minimum energy level resulting from the trapezoidal shape with a magnetization direction of the single domain state essentially parallel to the air-bearing surface in the absence of a magnetic bias.

15. The disk drive of claim 11 wherein the trapezoidal shape has substantially symmetric 120-degree angles at the air-bearing surface.

16. The disk drive of claim 11 wherein the MR stripe favors a single domain state by having a minimum energy level resulting from the trapezoidal shape with a magnetization direction of the single domain state essentially parallel to the air-bearing surface in the absence of a magnetic bias.

17. The disk drive of claim 12 wherein the trapezoidal shape has substantially symmetric 120-degree angles at the air-bearing surface.

18. The disk drive of claim 12 wherein the MR stripe favors a single domain state by having a minimum energy level resulting from the trapezoidal shape with a magnetization direction of the single domain state essentially parallel to the air-bearing surface in the absence of a magnetic bias.

* * * * *